*INVENTOR.*
SIDNEY BRIGGS, III

BY

ATTORNEY

United States Patent Office 3,325,623
Patented June 13, 1967

3,325,623
LONGITUDINAL STRIP EDGE BUTT WELDING
Sidney Briggs III, Bay City, Mich., assignor to Thomson Corporation, Bay City, Mich., a corporation of Delaware
Filed Nov. 27, 1963, Ser. No. 326,545
12 Claims. (Cl. 219—102)

This invention relates to longitudinal metal strip edge butt welding and more particularly to apparatus for and a successful method of continuous welding coil strip metals at adjacent longitudinal edges by high frequency electrical currents.

The invention involves bringing metal strips into edgewise contact under pressure after heating such edges to plastic forging temperature by the application of edge heating high frequency currents. The edges to be welded are substantially disposed in a common vertical plane but separated from each other from a point at which welding of the strips occurs. In one embodiment of the invention, the adjacent longitudinal strip edges are disposed at a vertical angle to each other but lie in a plane such that as the two strips are welded and drawn away from their weld point no distortion of either of the strips is generated through the mechanical efforts applied by the apparatus.

In effecting a continuous running weld of the strips (taken from coils) at their adjacent edges, one of the strips enters the welding area of the apparatus at a substantially horizontal plane and leaves the area butt welded to its complemenatary strip in substantially the same plane. The second strip enters the welding area from an elevated position and at an acute angle to the first strip, the planes of the two strips intersecting in a line substantially at or closely adjacent the welding point of the strips. Inasmuch as the two strip planes are intersected by a transverse plane containing the longitudinal edges to be welded, the more nearly the transverse plane is normal to the strip planes the more effective and efficient will be the welding of the two strips.

A theoretically perfect vertical alignment of the edges would not, however, provide a successful weld. If the adjacent strip edge would just pass each other or would just brush against each other as they come into planar alignment, it would be necessary to compress the strips in their welding plane to a degree or magnitude such that planar distortion forward of the weld or forging point would naturally result. In such event, the meeting edges would be put into tension and the remote edges into compression, the planar distortion interfering with a successful continuous production weld.

A practical successful solution to the strip butt edge welding problem has been found in the discovery that by a very slight overhang of the higher strip with respect to the inner edge of the lower strip, an overhang measured in a few thousandths of an inch, the two strips can be butt welded together by lateral forging rolls and vertical compression rolls on a continuous production basis by the apparatus and the method described below. It has further been found that by disposing the forging plane (i.e. a vertical plane passed through the vertical axes of the forging rolls) just slightly forward of the vertical compression plane (i.e. the plane through the horizontal axes of the compression rolls) more accurate and positive control over the weld point is achieved.

This control over the weld point is significant and important. High frequency electric currents, generated by a radio frequency generator capable of an output of 60 or more kilowatts of current at from 100 to 450 kilocycles, are utilized to heat the edge surface of each of the metal strips that will be compressed together by the forging rolls. In order to heat these edges by high frequency current, a generator of suitable capacity and frequency together with controls is installed adjacent the strip welding apparatus, and current conductors are extended from the generator and auxiliary equipment, if any, to electrodes making contact with the strips to be welded. The electrodes, one on each strip, are disposed at a short distance from the plane of the forging rolls passing transversely through the strips adjacent the weld point. The currents produced by the generator at high frequency travel substantially on the surface of the strips from and between the contact points of the electrodes to the weld point. As the conducting metal surfaces heat up under the excitation of the alternating current flow, the edge surfaces appear to become heated to plastic temperature in the range for cold rolled and stainless steels of from approximately 2000° F. to approximately 2400° F.

The temperatures reached by the edge surfaces are dependent in a measure upon the distances of the electrodes to the weld point. If the weld point varies or fluctuates, the temperature at the edge surfaces rises and falls in direct proportion, i.e. if the weld point distance from the electrode contact increases, the temperature increases, and if the weld point distance decreases, the temperature drops. Under these conditions, control of the weld point becomes a most desirable if not a necessary and essential factor in the process. It has been found that by disposing the plane through the strip forging rolls just slightly ahead of the plane through the horizontal pinch rolls the weld point shift is more closely confined and limited than when the two planes coincide. Thus, a significant variable has been reduced to a closely controlled factor whereby edge temperatures are relatively stable and controllable.

Heat depth penetration in the metal strip edges is another factor to be considered in the continuous butt welding process and is provided for in the apparatus of this invention. The heat depth penetration increases as the temperature of the edge increases. Only slight heat penetration is desirable inasmuch as the forging pressures applied are substantial, and excessive forging at the butt-weld edges will result in substantial and undesirable upset of the weld metal. Therefore, the flow rate of metal, the power and frequency of current applied at the electrodes, the distances of the electrodes to the weld point, the relatively constant position of the weld point, and the slight overhang relationship of the strip edges being heated to plasticity are all factors that require cooperation and coordination to produce a successful method and apparatus for butt welding the longitudinal adjacent edges of metal strip in a continuous production manner. These factors have been stabilized and controlled in the apparatus and by the method of this invention.

It is an object of the invention to provide apparatus and process for butt welding the surfaces of adjacent longitudinal edges of metal strip by means of high frequency electric currents applied to and heating such edge surfaces. Another object is to provide means for closely controlling the weld point in the path of such electric currents by means of forging and compression roll location and orientation. A further object is to provide apparatus for moving the metal strips into the welding area in such a manner that when the edges to be welded are brought into butt welding relationship there is a slight overhang of the edge portions heated to plasticity so that these portions engage and wipe across each other as they pass through the weld zone and are forged together by laterally applied forging rolls at or adjacent the weld point, rather than being substantially lapped horizontally and compressed vertically, as in the forming of a lap seam or joint. Another object is to provide horizontal pinch rolls upon the composite welded metal strip at a point or line just a little beyond the line of application of the forging pressure. A further object is to coordinate the temperature of the electrically heated zones at the edges to be butt welded with the flow rate of the metal strips for controlling the location of the weld point within relatively close limits. A principal object is to provide apparatus and process for successfully butt welding longitudinal adjacent edges of metal strip in a continuous production manner by the application of high frequency electric current to such edges.

These and additional objects of the invention and features of construction and processing will become more clearly apparent from the description given below in which the terms employed are used for purposes of description and not of limitation.

Reference is here made to the drawings annexed hereto and forming an integral part of this specification, and in which FIGURE 1 is a perspective view of one embodiment of apparatus for practicing the invention in connection with the butt welding of metal strips.

FIGURE 8 is a vertical view, substantially in elevation taken substantially on the line 8—8 of FIGURE 1.

Figure 1:
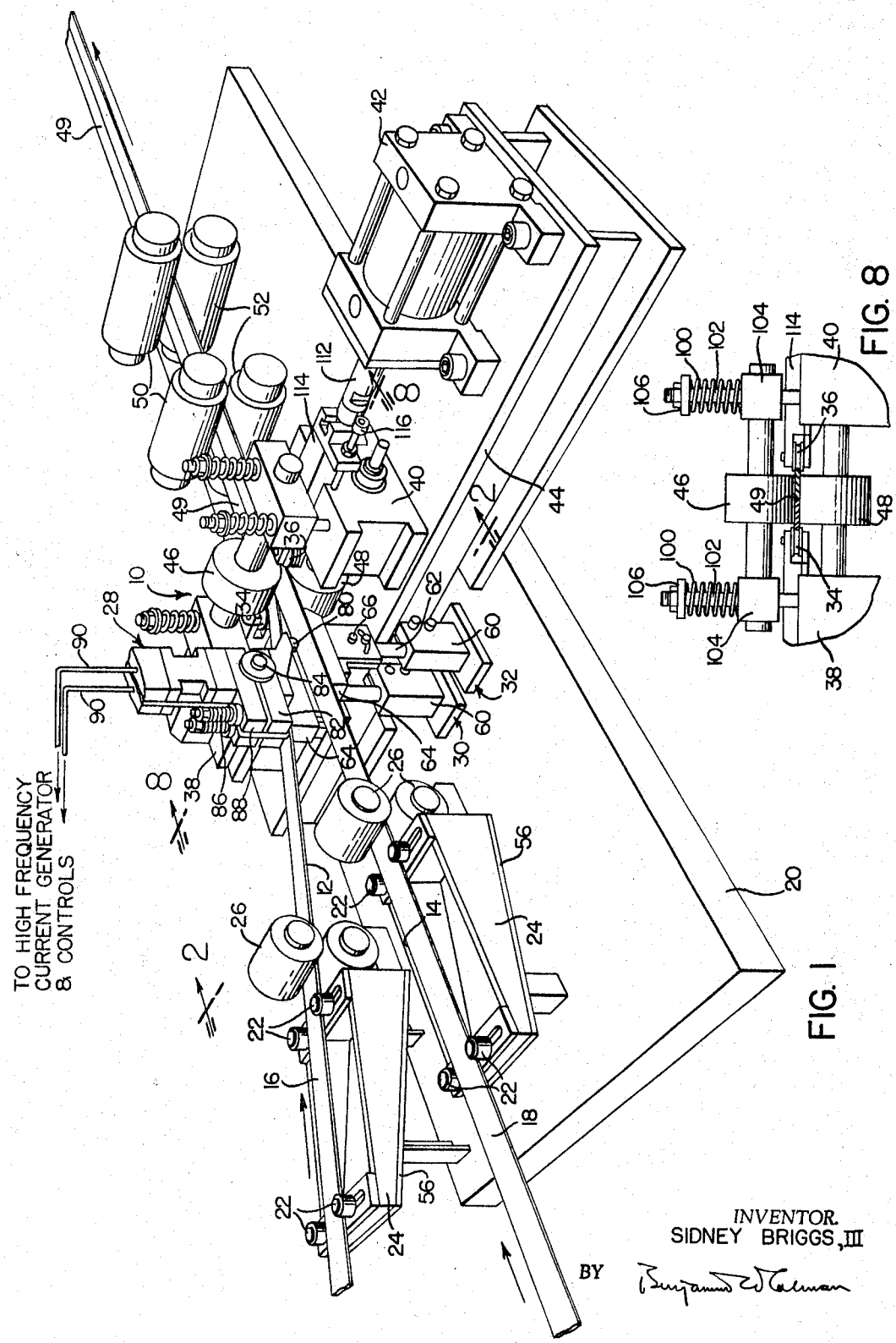

As shown in the several views of the drawings, the apparatus 10 for butt welding adjacent longitudinal edges 12 and 14 of metal strips 16 and 18, respectively, comprises a fixture base 20, strip guide rolls 22 on stands 24, strip tensioning rolls 26, an electrode contact welding fixture 28, strip supports 30, 32 under the fixture, horizontally acting strip forging rolls 34, 36 supported in fixtures 38, 40 respectively and held in compression against the outer lateral edges of the two strips by a pneumatic air cylinder 42, the fixtures 38, 40 and the cylinder 42 being supported on an auxiliary base 44, vertically acting compression rolls 46, 48 operating on the welded composite strip to draw it toward a wind-up reel (not shown) from the compression rolls. The high frequency generator supplying the current and power for the welding operation is not shown, nor are several other units including a transformer, and manually operable control devices, all well known by persons skilled in the art to which the invention pertains.

The metal strips 16 and 18 are electrically conductive in nature and more particularly, but not exclusively, are principally ferrous in composition. The strips may be relatively thin or thick in cross-section. Successful butt welding by the apparatus and method hereindisclosed has been practiced upon strips of from .018 to .028 inch inclusive, but strip thickness of greater or lesser magnitude can also be successfully butt welded by the instant apparatus and method. Some of the strips that have been butt welded together are electrogalvanized (zinc coated) cold rolled steel and stainless steel. Ordinary cold rolled steel and other steels have also been successfully butt welded together into composite strips. The term "composite strip" includes welded identical strip materials as well as diverse strip materials.

The two strips are taken from reel supported coils (not shown) mounted on stands insulated from each other and from the floor or base upon which the reels or mounts are supported. Electrical currents introduced by the generator and controls to the two strips by the contact fixture 28 will flow in the directions of least impedance and reactance and generally through a circuit toward each contact or to a ground. In order to limit current losses and undesired metal heating, the fixture elements making direct contact with the metal strips are preferably insulated from each other and from the base or mounts upon which they are supported. This requirement is particularly applicable to the stands 24, tensioning rolls 26, forging roll fixtures 38, 40 and the compression rolls, 46, 48.

The fixture base 20 is preferably supported on a rigid base or stand so as to elevate the welding fixture 28 to a level about waist high, or slightly higher, for more effective observation of the strips passing through the fixture by an operator handling the power generator controls. Mounted on the base 20 are the strip guide roll stands 24 having at least four (4) guide rolls 22 adjustably secured to the stand so that strip 18 is positively guided into position laterally adjacent the complementary strip 16 at the weld zone, as in FIGURE 3. Alignment of the strips 16 and 18 starting from the coil and reel positions is critical and care must be exercised in respect to such alignment in order to produce a successful continuous production weld of the strips. The strip 16 is similarly guided by its stand 24 supported on base 20 but elevated by support 30 so that the strip 16 enters the weld zone at an acute angle to the plane of the strip 18.

Figure 5A:
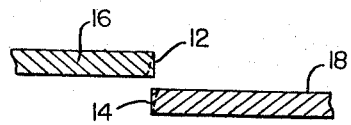
FIGURE 5A is a vertical sectional view taken transversely of the two metal strips as they approach the weld point beyond the electrodes.

Under each of the guide roll stands 24 are insulating sheets or pads 56 required to electrically insulate the stands and their strips from each other. Guide rollers 22 are adjustable laterally of the stands 24 so that the strips 16 and 18 will line up in a very slightly overhanging relationship. This overhang disposition or attitude is maintained from the initial coil position, and is carried through guide roll stands 24 and the strip supports 30, 32. By so doing, the strips come into weld attitude in a true flat overhung disposition as shown in FIGURE 5A.

The overhang of strip 16 with respect to strip 18 is measured in a few thousandths of an inch. Coil strip stock is produced and sold in widths having variable tolerances. To hold the composite strip wdith wtihin limits such that the upset at the weld line is relatively small and controllable, the width of the composite strip is established at from about .005 to about .010 inch less than the combined widths of the two strips being welded. The selection and determination of the width diminishing factor is based in part upon the compression force of the compression rolls 46, 48 operating against the upset bead and upon the variation in tolerances of the two strips. The nominal forging reduction of the rolls 34, 36 for strips of approximately .020 inch thickness is about .008 inch, providing an upset bead at the weld line that is easily compressed by the compression rolls 46, 48 to produce a composite strip 49 of substantially uniform thickness throughout.

As the strips 16, 18 leave their guide roll stands, a pair of pinch or drag rolls 26, 26 apply a braking action upon the strips. These rolls are mounted in stands (not shown) in such a manner that the strips are subjected to considerable pressure by and between the rolls, which are made of a polyurethane plastic composition known by the trade name "Disogrin." However, other materials similar in function can also be utilized. The pressure applied by the rolls 26, 26 is such that the strips are dragged and gripped by the rolls with great frictional engagement, thus effecting a braking or tensioning action upon them from the rolls 26, 26 through to the draw rolls 50, 52. Holding the strips under firm tension in the weld zone eliminates buckling or flexing of the strips and consequently improves control of the overhanging relationship of the strip edges 12 and 14, and of the weld point.

Upon leaving rolls 26, 26, strip 18 moves to a slide position upon the support 32 which comprises a base 60, a post 62, and a strip rest 64 secured to the post which is adjustable vertically in base 60. The rest 64 is rotatably adjustable in a vertical plane on a pin 66 mounted in the post, the adjusted position being secured by a screw 68 passed through a semi-circular slot in the rest plate 70. The rest 64 of strip support 32 is disposed in a substantially horizontal plane for strip 18. The strip support 30 is composed of the same elements as those described for support 32, the rest 64 being disposed at an acute angle to the horizontal to accommodate the strip 16. For the strips heretofore tested and welded, the rest 64 of strip support 30 is disposed at an acute angle to the horizontal plane ranging from 3° to 10°, as a preferred angular range. However, for other strip welding such angular relationship can be modified by increasing or decreasing the angle depending upon the criticality of the power input at the electrode contacts, the speed or flow rate of the two strips, the proximity of the current-carrying edge portions, the relative shift or non-shift of the weld point, and the presence of arcing across the strips in the area of the current-carrying edge portions. Since the electrical efficiency of the high frequency circuit between electrode contacts and through the weld point is increased as the angular relationship of the current paths approach zero, the optimum angular relationship of the two strips is reached when for a given power input at a particular frequency and at a given strip flow rate, the angle between the strips is just slightly greater than that angle at which arcing between the electrodes or the strips has or will occur.

Disposed above the strips 16 and 18 at the supports 30 and 32, respectively, is the electrode amount 28. This mount can be constructed in a number of ways, and such constructions form no direct part of the instant invention. A representative embodiment of a mount that can be utilized comprises an electrode contact 80 secured to an arm 82 pivotable about a pin 84, the arm being held against a resilient spring 86 so that the contact 80 is freely slidable and in electrical and bearing contact with and upon the strip at all times, the upper end 88 of the mount being securely held in supports (not shown) cooperatively associated with the current generator equipment. Each side of the mount is insulated from the other side and is direct connected to the generator equipment by an individual liquid cooled current conductor 90.

The electrode contacts 80 ride the strips 16, 18 adjacent the edges 12 and 14, respectively, welding current flowing upon the surfaces of the strips adjacent these edges and heating them as the metal resists the high frequency flow and reverse flow of the current. Having in mind that the strips are moving at a very high speed past the electrode contacts 80, where welding current is imparted to the strips, the time period of current acceptance is only a small fraction of a second. Yet within that period, the surfaces of the edges are heated to a temperature at which the metal is plastic and the edges weldable. As a representative example only, and without limitation against modification for other situations, electrogalvanized cold rolled steel strip has been butt welded to stainless steel strip in a continuous production manner at a speed or flow rate of 400 feet per minute or more, the electrode contacts 80 being disposed at a distance of approximately 3 inches from the weld point on the galvanized steel strip and at about 2 inches on the stainless steel strip, using a 60 kw. generator operating at a frequency of 450 kilocycles. Under these conditions the galvanized steel strip edge is being heated to welding temperature in about .0375 second and the stainless steel strip edge in about .025 second.

Figure 4:
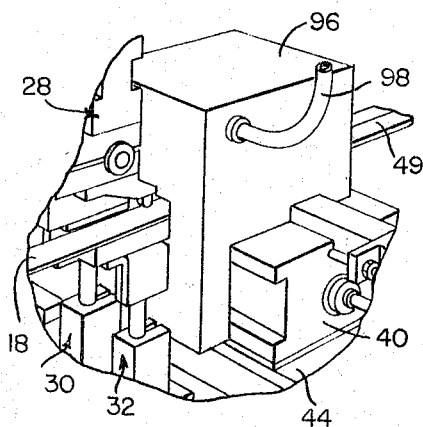
FIGURE 4 is a fragmentary perspective view showing a gas hood over the welding zone, the forging rolls and the horizontal compression rolls.

It has been found that in welding zinc coated galvanized steel strip to stainless steel strip, some of the zinc in the surface area heated by the electric currents becomes vaporized and oxidized and surrounds the weld zone in a cloud of zinc ions or zinc oxide particles that tend to short out the currents and reduce their welding effectiveness. To eliminate this defect where a zinc surface coating is present on the strip, a neutral or inert gas such as carbon dioxide has been introduced within a hood 96 by means of a conduit 98 leading from a source of supply of such gas (FIG. 4). Nitrogen or other inert gas may be applied within the hood or by jets to clear away the zinc. The hood is disposed over the area of the weld zone and is open wherever mechanical parts or other structural features are present. The gas is continuously fed or metered into the hood and escapes to the atmosphere from areas of machine components adjacent edges of the hood. The carbon dioxide gas reduces the oxidation of the zinc, thereby eliminating arcing or short circuiting of the currents during the heating and welding operation.

Figure 3:
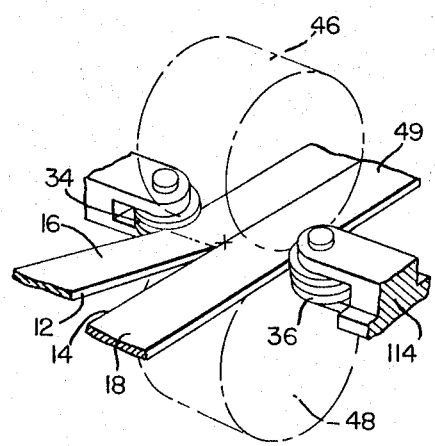
FIGURE 3 is a slightly enlarged fragmentary perspective view taken from a point just forward of the weld point and the forging rolls.

As seen in FIGS. 1, 3 and 8, the compression rolls 46, 48 are vertically arranged above the composite strip 49, and are disposed slightly rearwardly of the forging rolls 34, 36, i.e., a vertical plane passed through the horizontal axes of the compression rolls is just a bit rearwardly of a vertical plane passed through the axes of the horizontal forging rolls. It was found that setting the compression rolls in vertical alignment with the forging rolls interfered with effective butt welding of the strips. When the compression rolls were placed slightly behind the forging rolls, the latter were able to act more effectively upon the weld point and to weld the composite strip. By allowing only one set of rolls, the forging rolls, to operate upon the two strips at the weld zone, it was further found that the weld point was more successfully controlled and limited in its longitudinal shift, than if both sets of rolls were in operation simultaneously upon the strips.

The compression rolls 46, 48 are held in pressure bearing contact upon the composite strip 49 by the compression springs 100 operating on posts 102 against the shaft supports 104, 104 to compress the upset bead of the welded composite strip 49. The pressure applied by the springs can be increased or decreased by adjusting the spring retaining caps 106 downwards or upwards. When both strips 16 and 18 are of equal thickness, the rolls 46, 48 are uniformly ground. Should a composite strip be required or produced of two strips of unequal thickness, the rolls 46, 48 should be machined and ground to accommodate the configuration at the weld line, having in mind the compression of upset metal. This is the essential action of rolls 46, 48, i.e., it is not an action of vertically compressing or meshing a lapped joint, as in known seam welders.

After passing through the compression rolls 46, 48, the composite strip 49 is drawn by the rolls 50, 52, which may be a single stand or multiple stand as required, to the wind-up reel (not shown) that can be at a fair distance from the rolls 50, 52. Time should be allowed for the welded metal to cool sufficiently for generation and stabilization of the desired metallurgical structure before subjecting the composite strip to mechanical working by bending about the wind-up reel.

Figure 2:
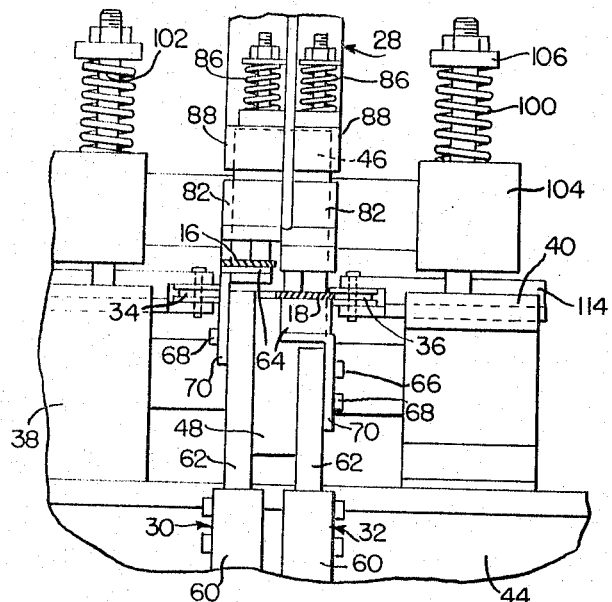
FIGURE 2 is a vertical elevational view partially in sectional taken substantially on the line 2—2 of FIGURE 1.
Figure 5B:
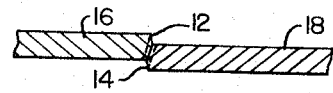
FIGURE 5B is a vertical sectional view, similar to that in FIGURE 5A, showing what is believed to occur as the two adjacent strip edges, heated to plasticity, slip and wipe across each other.
Figure 6:
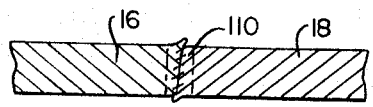
FIGURE 6 is an enlarged fragmentary transverse vertical sectional view taken at the welded zone of the composite strip.
Figure 7:
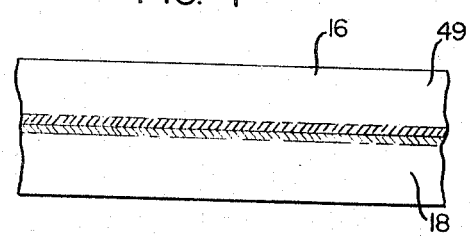
FIGURE 7 is a fragmentary top plan view of the composite strip.

The very slight overhang of the two strips 16, 18 as they approach the weld point (FIGURES 2 and 3) is so controlled that the heated edges 12 and 14, as shown in FIGURES 5A, 5B and 6, tend to wipe across each other, and become no longer overlapped. It is believed that, due to the heat generated in the edges and particularly to the concentration of heat in the surfaces of closely adjacent and approaching edge portions, the metal at one edge is wiped across the metal of the adjacent edge producing, under pressure of the forging rolls, a forged welded juncture 110 as shown in FIGURE 6 just prior to upset compression by the compression rolls 46, 48. Inasmuch as the speed of the welding operation is at the rate of 80 inches or more of strip per second, it is not as yet possible to fully and accurately determine exactly what takes place in the edge wiping area of the weld zone, but it is believed that the above constitutes a very possible and probable description of the operation.

Such a weld method is not a lap or mash weld of the two strips, but appears to be a true butt weld process in that the edges are in substantially planar contact when the forging rolls 34, 36 apply their horizontal pressure. Under such pressure, it would appear that the heat sink in each of the metal edges 12 and 14 is increased to a slightly greater depth so that a more uniform and more satisfactory weld structure is achieved than would occur with a lap or mash weld.

Forging pressure applied by the rolls 34, 36 is controlled by the pneumatic air cylinder 42 operating through the rod 112 and roll support 114. The set screw 116 predetermines the width of the composite strip 49 and the allowable forward movement of the roll 36.

The forging rolls 34, 36 are preferably made of bronze, brass or other nonmagnetic materials such as ceramics. It appears that, due to the close proximity of the rolls to the welding current paths, rolls of steel become inductively heated to temperatures at which they cannot operate with efficiency. Lubrication in the bearings of such steel rolls is liquified and runs out so that the rolls rotate on dry shafts and seize at their bearings. The forging rolls operate under an applied pressure from the air cylinder 42, further adding to the load on the bearings. To avoid such failure, the rolls 34, 36 and their bearings are therefore made of the aforementioned nonmagnetic materials which are not subject to induction heating.

Although actual testing resulting in the composite strip formed by the method and apparatus of this invention has been made with a high frequency generator operating at about 450,000 cycles per second, it is to be understood that high frequency equipment operating at frequencies of the order of from about 100,000 cycles per second up to and even beyond the range of 450,000 cycles per second can be utilized in the method and in connection with the apparatus of this invention. Where thin strip materials are being welded, the higher frequencies are preferred in order to obtain suitable surface welding temperatures with a minimum of heat depth pentration. For metal strips of relatively greater thickness the frequency range could be lower than 450,000 cycles per second in order to achieve a slightly greater heat depth penetration at the edges to be welded.

The overhanging and overhung relationship of the two strips 16 and 18 from positions adjacent their coils or from the positions of the drag rolls 26, 26 through to the draw rolls 50, 52 is of course somewhat critical. The wiping action of the heated edges desired in the processing of the composite strip will be effected if such overhang is less than that which results in a lap at the welded edges. A lap weld requiring a mashing of the lap, does not come within the scope or concept of this invention which involves only a butt welding of the heated edges. Although some upset material is generated in the wiping action of the edges, no lap nor overlying weld of the two strips results from the overhanging relationship of one strip with respect to the other in the weld zone of this processing and apparatus. Th forging rolls 34, 36 compress the strips 16 and 18 together into a butt weld, throwing up a slight upset from each strip, in the plane assumed by the strips just prior to their entry between the compression rolls 46, 48. See FIGS. 5A, 5B and 6.

For relatively light gauge strip stock, an overhanging-overhung magnitude of from just over the edge of one strip to approximately one-half the thickness of the strip which is being overhung would appear to be satisfactory in the process of this invention for the production of an acceptable butt weld seam and composite strip. Such gauges would be in the thickness range of from .010" to .060" inclusive. For heavier strip stock, the overhanging-overhung magnitude could be up to as much as the full thickness of the strip which is being overhung.

The inventive method of high frequency electric current welding of composite strip hereindisclosed comprises disposing two metal strips in planes at an acute angle to each other such that the adjacent interior edge of one strip just slightly overhangs the adjacent interior edge of the second strip as they are drawn toward a weld point, introducing and conducting such current to the strips at their adjacent edges, wiping the interior adjacent edges now heated to a welding state by such current across each other into butt relationship, and forging them together by laterally disposed rolls applied under pressure to the exterior edges of the strips just prior to the compression of the composite strip between rolls operating upon the now-welded strip. Neither the forging rolls nor the compression rolls are draw rolls, these being applied beyond the site of the compression rolls and after welding of the strips into a composite strip has been completed.

In the process of the invention the two strips are aligned with respect to each other so that their interior edges are maintained in substantially the same parallel lines from the coil reels through the guide roll stands 24, the drag rolls 26, 26, and the strip supports 64 to the weld point, with a minimum of distortion and misalignment.

The apparatus described herein represents one embodiment of structures which can utilize the concept of invention hereindisclosed. Such apparatus provides guide roll stands that positively line up the interior strip edges 12 and 14 in a slightly overhanging relationship, supports that maintain the entry angle of the strips 16 and 18 of an order such that arcing is eliminated while maintaining current efficiencies at optimum or near-optimum values, and that provides laterally operating forging rolls to forge weld the strips together at a line ahead of compression rolls which compress the weld upset bead and the composite welded strip to a uniform thickness while maintaining the weld point substantially at a single position with respect to the fixed electrode contacts.

Having described the invention in its simplest terms, it is to be understood that the features of the process and apparatus hereindisclosed may be changed and somewhat varied in degree without departing from the essence of the invention.

I claim:

1. In the method for continuous production welding of a seam extending along adjacent edges of elongated metal strips, continuously advancing portions of said strips with their said adjacent edges toward and into the line of the desired seam and through and past a weld zone containing a weld point, introducing and conducting an electrical current from a source to said metal strips by two terminals in respective electrical contact with said strips so as to heat said edges by said current to a welding state, said terminals initiating said weld zone in said strips at positions where said strips are in a substantially spaced apart attitude and substantially in advance of said weld point, advancing one of said strips substantially along a plane disposed at an acute angle to the plane along which the second strip is being advanced into said weld zone toward said weld point, and disposing and maintaining said adjacent edges at least in said weld zone in a slightly overhanging and overhung relationship, while restraining said adjacent edges from lateral separation parallel to said plane from said relationship by exerting restraining effort on the strips in said weld zone and in lateral directions toward said adjacent edges, so as to cause said heated edges to wipe across each other as they approach and pass into said weld point and become welded in a common plane.

2. The method of claim 1, in which said acute angle approximates 3° to 10°.

3. The method of claim 1, and further comprising placing said strips in tension between points substantially ahead of the strip contact positions of said terminals and a point beyond the position at which said strips are welded in a common plane.

4. In apparatus for welding a seam extending along adjacent edges of elongated metal strips, means for continuously drawing portions of said strips with their adjacent edges advancing toward and into the line of the desired seam, a source of electrical current, terminals connected to said source of current and disposed in electrical contact with each of said metal strips respectively to introduce said current to said metal strips adjacent said edges and form a weld zone from said terminals to a weld point, means for disposing one of said strips in a plane and another of said strips in a second plane at an acute angle to said first plane, and means to dispose and maintain said adjacent edges at least in said weld zone in a slightly overhanging-overhung relationship from said terminals to a position adjacent said weld point, said last named means comprising means exerting restraining effort on the strips in said welded zone and in lateral directions toward said adjacent edges, so as to prevent lateral separation thereof and so as to bring said adjacent edges when heated to a welding state into edge wiping relationship in said weld zone as they approach and pass into said weld point and become welded in a common plane.

5. The apparatus of claim 4, in which the angle at which said first named disposing means positions said strips approximates 3° to 10°.

6. The apparatus of claim 4, and further comprising means to place said strips in tension between points substantially ahead of the strip contact positions of said terminals and a position beyond the point at which said strips are welded in a common plane.

7. The apparatus of claim 6, in which said strip tensioning means comprises a pair of rollers engaging each of said strips susbtantially ahead of the strip contact positions of said terminals and applying a braking action upon each strip.

8. The apparatus of claim 6, in which said strip tensioning means comprising a pair of rollers engaging each of said strips substantially ahead of the strip contact positions of said terminals and applying a braking action upon each strip, and means engaging opposite edges of each strip in advance of said strip contact positions to confine the same laterally in approaching said welded zone.

9. A method for continuous production welding of a seam extending along adjacent edges of elongated metal strips, comprising continuously advancing portions of said strips with their said adjacent edges toward and into the line of the desired seam and through and past a weld zone containing a weld point, intensely heating said edges to a welding state at positions where said strips are in a substantially spaced apart attitude and substantially in advance of said weld point, advancing one of said strips substantially along a plane disposed at an acute angle to the plane along which said second strip is being advanced into said weld zone toward said weld point, and disposing and maintaining said adjacent edges at least in said weld zone in a slightly overhanging and overhung relationship, while restraining said adjacent edges from lateral separation parallel to said plane from said relationship by exerting restraining effort on the strips in said weld zone and in lateral directions toward said adjacent edges, so as to cause said heated edges to wipe across each other as they approach and pass into said weld point and become welded as a composite strip in a common plane.

10. The method of claim 9, in which said strips are of similarly relatively light gauge stock, the dimension of said overhanging and overhung relationship approximating one half the thickness of the stock.

11. The method of claim 9, in which the dimension of said overhanging and overhung relationship approximates the thickness of the stock of the strips.

12. The method of claim 9, and further comprising placing said strips in tension between points substantially ahead of said weld point and behind the point at which the strips are welded in a common plane, and laterally confining said strips against lateral separation in approaching said weld zone.

References Cited
UNITED STATES PATENTS

| | | | |
|---|---|---|---|
| 1,092,207 | 4/1914 | Ryan | 219—52 X |
| 1,357,156 | 10/1920 | Von Eckermann | 219—105 |
| 2,922,020 | 1/1960 | Andrew | 219—59 X |
| 3,017,494 | 1/1962 | Mackey | 219—72 X |
| 3,193,657 | 7/1965 | Gebauer | 219—72 X |

RICHARD M. WOOD, *Primary Examiner.*

B. A. STEIN, *Assistant Examiner.*